US012745325B2

(12) United States Patent
Ishino et al.

(10) Patent No.: US 12,745,325 B2
(45) Date of Patent: Sep. 22, 2026

(54) TRANSPARENT HEATER

(71) Applicant: DENSO CORPORATION, Kariya-city (JP)

(72) Inventors: Katsuma Ishino, Kariya-city (JP); Yoshihiro Kozawa, Kariya-city (JP); Kenji Nakamura, Kariya-city (JP); Hidehiko Hiramatsu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 526 days.

(21) Appl. No.: 18/475,000

(22) Filed: Sep. 26, 2023

(65) Prior Publication Data

US 2024/0015854 A1 Jan. 11, 2024

Related U.S. Application Data

(63) Continuation of application No. PCT/JP2022/015085, filed on Mar. 28, 2022.

(30) Foreign Application Priority Data

Apr. 1, 2021 (JP) ................................ 2021-062595

(51) Int. Cl.
*H05B 3/14* (2006.01)
*H05B 3/84* (2006.01)

(52) U.S. Cl.
CPC ................ *H05B 3/14* (2013.01); *H05B 3/84* (2013.01); *H05B 2203/017* (2013.01)

(58) Field of Classification Search
CPC . H05B 3/14; H05B 3/84; H05B 3/145; H05B 2203/017; H05B 2203/013; H05B 2214/04; H01B 5/14
See application file for complete search history.

(56) References Cited

U.S. PATENT DOCUMENTS

| | | | |
|---|---|---|---|
| 2017/0285786 A1 | 10/2017 | Hondo | |
| 2021/0360745 A1 | 11/2021 | Naruse et al. | |

FOREIGN PATENT DOCUMENTS

| | | |
|---|---|---|
| JP | 2014044839 A | 3/2014 |
| JP | 2014120353 A | 6/2014 |

(Continued)

OTHER PUBLICATIONS

Toshiharu Enomae, "Non-destructive paper surface fiber orientation analysis program FiberOri8single03.exe (V.8.03.)", http://www.enomae.com/FiberOrI/index.htm (Sep. 15, 2018).

*Primary Examiner* — Robert G Bachner
(74) *Attorney, Agent, or Firm* — Harness, Dickey & Pierce, P.L.C.

(57) ABSTRACT

A transparent heater includes: a substrate that is transparent to a visible light and has one surface; and a conductive layer that is disposed on the one surface, is transparent to the visible light, and contains an aggregate of carbon nanotubes. The conductive layer includes: a patterned portion that includes a linear portion linearly extending in a first direction parallel to the one surface; and a non-patterned portion that is a film-shaped portion connecting to the patterned portion in a second direction parallel to the one surface and orthogonal to the first direction, and has a thickness smaller than that of the patterned portion in a third direction orthogonal to the one surface. The non-patterned portion has an orientation direction of the carbon nanotubes defining less than 45 degrees with respect to the second direction, the orientation direction being measure by an orientation evaluation method.

4 Claims, 7 Drawing Sheets

(56) References Cited

FOREIGN PATENT DOCUMENTS

| | | | |
|---|---|---|---|
| JP | 2020119744 | A | 8/2020 |
| WO | WO-2016104723 | A1 | 6/2016 |

TRANSPARENT HEATER

CROSS REFERENCE TO RELATED APPLICATIONS

The present application is a continuation application of International Patent Application No. PCT/JP2022/015085 filed on Mar. 28, 2022, which designated the U.S. and claims the benefit of priority from Japanese Patent Application No. 2021-062595 filed on Apr. 1, 2021. The entire disclosures of all of the above applications are incorporated herein by reference.

TECHNICAL FIELD

The present disclosure relates to a transparent heater including an aggregate of carbon nanotubes (CNTs).

BACKGROUND

It has been known a transparent heater including a substrate having one surface and a conductive layer containing an aggregate of CNTs and disposed on the one surface of the substrate.

SUMMARY

The present disclosure describes a transparent heater including a substrate having one surface and a conductive layer disposed on the one surface of the substrate. According to an aspect of the present disclosure, the substrate is transparent to a visible light, and the conductive layer is transparent to the visible light and contains an aggregate of carbon nanotubes. The conductive layer includes: a patterned portion that has a linear portion linearly extending in a first direction parallel to the one surface; and a non-patterned portion that is a film-shaped portion connecting to the patterned portion in a second direction, which is parallel to the one surface and orthogonal to the first direction, and has a thickness smaller than the patterned portion in a third direction, which is orthogonal to the one surface. In the non-patterned portion, the carbon nanotubes has an orientation direction defining less than 45 degrees with respect to the second direction, the orientation direction being measured by an orientation evaluation method using an image processing on an electron microscope image.

BRIEF DESCRIPTION OF DRAWINGS

Features and advantages of the present disclosure will become more apparent from the following detailed description made with reference to the accompanying drawings, in which.

DETAILED DESCRIPTION

To begin with, a relevant technology will be described only for understanding the embodiments of the present disclosure.

For example, a transparent heater includes a substrate having one surface and a conductive layer disposed on the one surface of the substrate and containing an aggregate of CNTs. The conductive layer includes a patterned portion having a linear portion that linearly extends in a first direction, and a non-patterned portion that is a film-shaped portion connecting to the linear portion in a second direction orthogonal to the first direction. The non-patterned portion is thinner than the patterned portion.

In such a transparent heater, since the patterned portion is thicker than the non-patterned portion, the patterned portion generates a larger amount of heat than the non-patterned portion. Therefore, the temperature of the non-patterned portion is lower than that of the patterned portion, and temperature unevenness occurs in the transparent heater in a planar direction parallel to the one surface of the substrate.

The present disclosure provides a transparent heater which is capable of reducing temperature unevenness in a planar direction.

According to one aspect of the present disclosure, a transparent heater includes: a substrate that is transparent to a visible light, and has one surface; and a conductive layer that is disposed on the one surface, is transparent to the visible light, and contains an aggregate of carbon nanotubes. The conductive layer includes: a patterned portion that has a linear portion linearly extending in a first direction parallel to the one surface; and a non-patterned portion that is a film-shaped portion connecting to the patterned portion in a second direction, which is parallel to the one surface and orthogonal to the first direction, and has a thickness smaller than the patterned portion in a third direction, which is orthogonal to the one surface. The non-patterned portion has an orientation direction of the carbon nanotubes defining less than 45 degrees with respect to the second direction, the orientation direction being measured by an orientation evaluation method using an image processing on an electron microscope image.

According to this, as compared to a case where the carbon nanotubes constituting the non-patterned portion are not oriented, heat is easily conducted from the patterned portion to the entirety of the non-patterned portion. Accordingly, the temperature difference between the non-patterned portion and the patterned portion can be reduced, and the temperature unevenness in the planar direction of the transparent heater can be reduced.

Embodiments of the present disclosure will be described hereinafter with reference to the drawings.

First Embodiment

Figure 1:
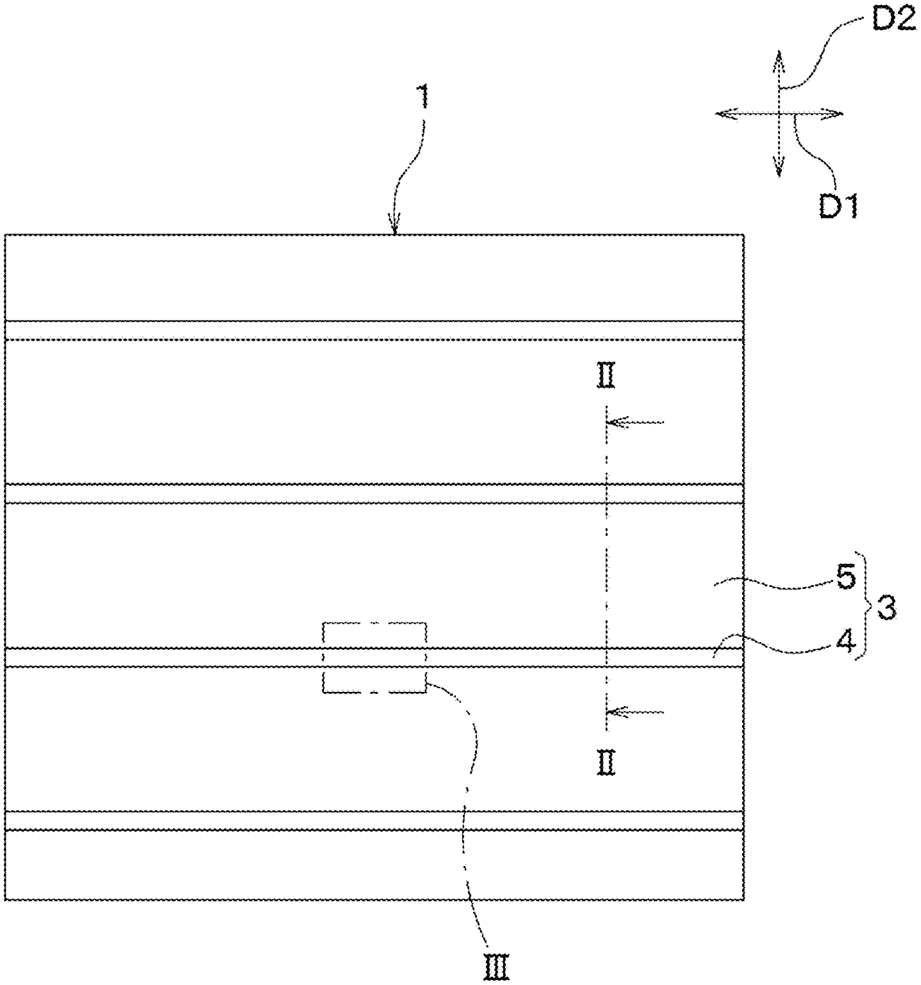
FIG. 1 is a top view of a transparent heater according to a first embodiment.
Figure 2:
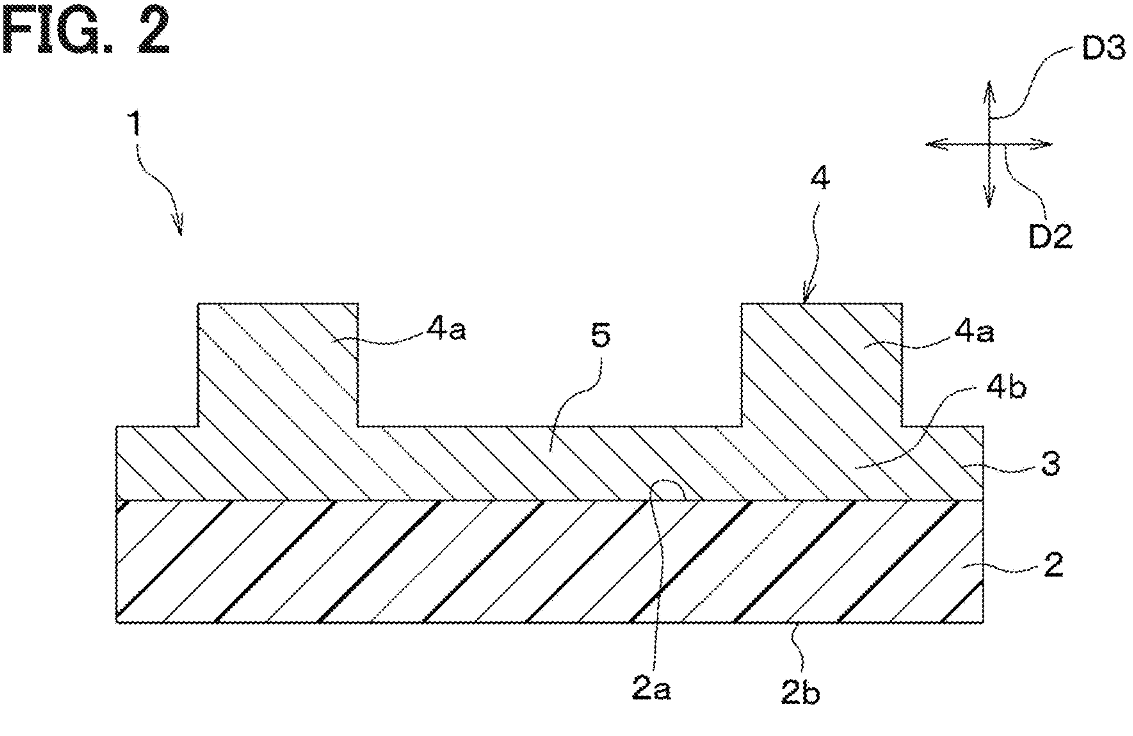
FIG. 2 is a cross-sectional view taken along line II-II of FIG. 1.

A transparent heater 1 of the present embodiment shown in FIGS. 1 and 2 is used as a heater for securing the function of an in-vehicle sensor or a windshield of a vehicle. The transparent heater heats the sensor or the windshield when icing, fogging and or like occurs on the sensor or the windshield. Accordingly, the icing, the fogging, or the like is eliminated. The transparent heater is not limited to being installed in a vehicle, and may be installed in an object other than the vehicle, such as a traffic light.

The transparent heater 1 includes a substrate 2 and a conductive layer 3. The substrate 2 has one surface 2*a* supporting the conductive layer 3 and the other surface 2*b* opposite to the one surface 2*a*. The one surface 2*a* is a surface of the substrate 2 on the conductive layer 3 side. The one surface 2*a* is flat. In each drawing, a first direction D1 is a direction parallel to the one surface 2*a*. A second direction D2 is a direction parallel to the one surface 2*a* and orthogonal to the first direction D1. A third direction D3 is a direction orthogonal to the one surface 2*a*.

The substrate 2 is transparent to a desired visible light, and has an electrical insulation property. The substrate 2 is made of a synthetic resin material (e.g., PC or the like) or an inorganic material (e.g., quartz glass or the like). PC is polycarbonate. The substrate 2 has a shape such as a film or a plate.

The conductive layer 3 is provided on the one surface 2*a* of the substrate 2. The conductive layer 3 includes an aggregate of CNTs. The aggregate of CNTs mainly forms the shape of the conductive layer 3. When being electrically conducted, the conductive layer 3 generates heat. The conductive layer 3 includes a plurality of patterned portions 4 and a plurality of non-patterned portions 5. Each of the plurality of patterned portions 4 and each of the plurality of non-patterned portions 5 are alternately arranged in the second direction.

Each patterned portion 4 is a portion of the conductive layer 3 including a linear portion 4*a* extending linearly in the first direction D1. The linear portion 4*a* is a portion of the conductive layer 3 protruding opposite to the substrate 2 in the third direction D3. The patterned portions 4 are disposed apart from each other in the second direction D2.

Each patterned portion 4 has a width in the second direction D2 which is not visually recognizable by a human. The width of each patterned portion 4 is smaller than an average length of the CNTs or an average length of the bundles of CNTs. The thickness of each patterned portion 4 in the third direction D3 is a size that is not visually recognizable. However, the thickness of each patterned portion 4 may be a size that is visually recognizable.

Each patterned portion 4 has a base portion 4*b*. The base portion 4*b* is a part of the patterned portion 4 on the base side, that is, a part of the patterned portion 4 on the substrate 2 side in the third direction D3. The base portion 4*b* is continuous with the linear portion 4*a* in the third direction D3, and is continuous with the non-patterned portion 5 in the second direction D2.

Each of the non-patterned portions 5 is a film-shaped portion of the conductive layer 3, and is continuous with the patterned portion 4 in the second direction D2. That is, each of the non-patterned portions 5 has a planar shape extending in a direction parallel to the one surface 2*a*. Each of the plurality of non-patterned portions 5 connects adjacent patterned portions 4 to each other. Among the plurality of non-patterned portions 5, one non-patterned portion positioned at the end in the second direction D2 is continuous with one patterned portion 4.

The thickness of each of the non-patterned portions 5 in the third direction D3 is smaller than the thickness of each of the patterned portions 4 in the third direction D3. Each non-patterned portion 5 has a thickness that does not impair the transparency, for example, a thickness at which the transmittance to the visible light is 90% or more. The width of the non-patterned portion 5 in the second direction D2 is greater than the width of each patterned portion 4 in the second direction D2.

In the plurality of patterned portions 4 and the plurality of non-patterned portions 5, the CNTs are oriented. In the patterned portion 4, the CNTs are oriented in a direction along the first direction D1. The direction along the first direction D1 means a direction defining an angle of less than 45 degrees with respect to the first direction D1. In the non-patterned portion 5, the CNTs are oriented in a direction along the second direction D2. The direction along the second direction D2 means a direction defining an angle of less than 45 degrees with respect to the second direction D2.

Here, the phrase that the CNTs are oriented means that the directions in which the CNTs extend and spread are aligned. The orientation direction of the CNTs is measured by an orientation evaluation method using image processing of an electron microscope image. The evaluation items of the orientation by the orientation evaluation method include an orientation direction and an orientation magnitude. The orientation direction and the orientation magnitude are measured by the following procedure using an electron microscope and a measurement apparatus that analyzes an image of the electron microscope and measures the orientation direction of the CNTs.

First, an electron microscope image of an object to be measured is acquired using a scanning electron microscope. In this case, as an example, the magnification is set to about ×30 k, the acceleration voltage is set to about 1.5 kV, and the image is acquired at 3 locations.

Subsequently, the image acquired by the electron microscope is trimmed to cut out an arbitrary portion so as to have a size used for image processing to be performed next.

Subsequently, the image processing is performed using an image processing software to obtain the orientation angle (i.e., the orientation direction) and the orientation magnitude. An average value of the obtained orientation angles at three locations and an average value of the obtained orientation magnitudes at three locations are calculated. That is, the arithmetic mean of each of the obtained orientation angles and orientation magnitudes is calculated.

As the image processing software, "Non-destructive paper surface fiber orientation analysis program FiberOri8single03.exe (V. 8.03.)" is used. This software is available from "http://www.enomae.com/FiberOri/index.htm". In this software, the orientation angle and the orientation magnitude are calculated by binarizing a microscope image and performing Fourier transform. The calculated orientation angle (that is, orientation angle (degree)) indicates an angle defined relative to the left-right direction of the image. The calculated orientation magnitude (that is, orientation intensity) indicates the strength of orientation. The orientation magnitude is represented by a numerical value of 1 or more. A numerical value in the range from 1.0 to 1.1 indicates no orientation. A numerical value in the range greater than 1.1 and less than 1.2 indicates having the orientation. A numerical value of 1.2 or more indicates a strong orientation.

Figure 3:
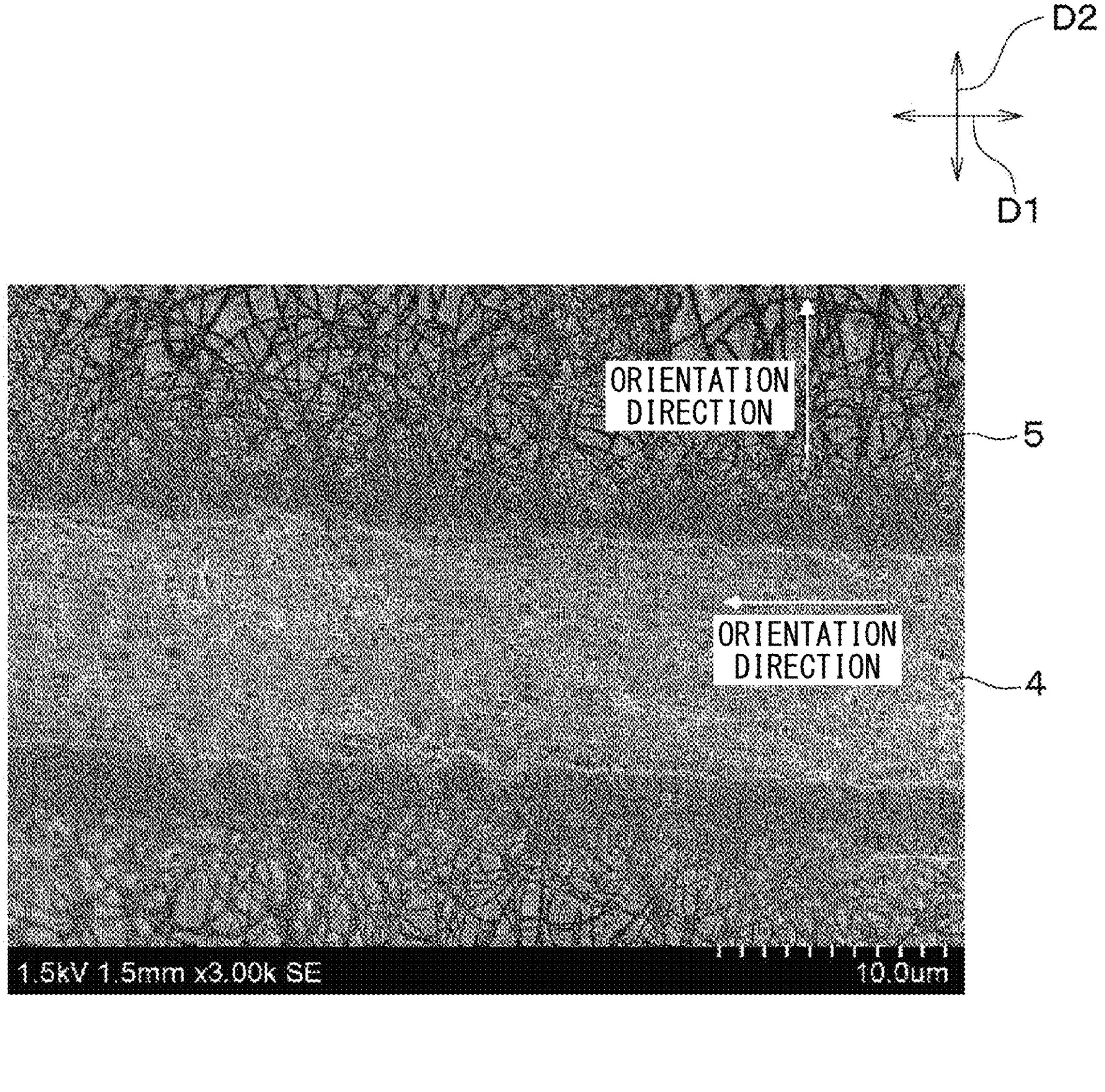
FIG. 3 is an electron microscope image of a part III of FIG. 1.

FIG. 3 is an electron microscope image of the transparent heater 1 actually manufactured by the present inventors. In the patterned portion 4, the CNTs are arranged in a dense state. The width of the patterned portion 4 is about 10 μm. The length of the CNTs and the length of the bundle of CNTs used herein were 20 to 30 μm.

In the non-patterned portion 5, the CNTs are arranged in a sparser state than in the patterned portion 4. The width of the non-patterned portion 5 is larger than 100 μm. The thickness of the non-patterned portion 5 is about 1 to 10 nm. The diameter of the CNT used herein is about 1 to 2 nm. The thickness of the non-patterned portion 5 is close to the diameter of a single CNT and is very thin. Therefore, the transmittance to the visible light of the non-patterned portion 5 is high.

Table 1 shows the results of measurement of the orientation angle and the orientation magnitude of the CNTs of the patterned portion 4 by the orientation evaluation method described above. The orientation angle is an angle with respect to the first direction D1.

TABLE 1

| | | | |
|---|---|---|---|
| Orientation Magnitude | 1.18 | 1.17 | 1.17 |
| Orientation angle | −5 | 8 | −1 |

As shown in Table 1, the orientation magnitude of the patterned portion 4 was within a range of greater than 1.1 and less than 1.2, and it was thus confirmed that the CNTs were oriented. In addition, it was confirmed that the average value of the orientation angles of the patterned portion 4 was 0.7, and the orientation direction of the CNTs was a direction along the first direction D1.

Table 2 shows the results of measurement of the orientation angle and the orientation magnitude of the CNTs in the non-patterned portion 5 by the orientation evaluation method described above.

TABLE 2

| | | | |
|---|---|---|---|
| Orientation Magnitude | 1.33 | 1.31 | 1.33 |
| Orientation angle | 93 | 94 | 92 |

As shown in Table 2, the orientation magnitude of the non-patterned portion 5 was 1.2 or more, and it was confirmed that the CNTs were strongly oriented. In addition, it was confirmed that the average value of the orientation angles of the non-patterned portion 5 was 93°, and the orientation direction of the CNTs was a direction along the second direction D2.

Note that the patterned portion 4 in which the CNTs were not oriented was formed, and the orientation direction and the orientation magnitude of the CNTs were measured by the orientation evaluation method described above. The measurement results of this case are shown in Table 3.

TABLE 3

| | | | |
|---|---|---|---|
| Orientation Magnitude | 1.06 | 1.02 | 1.05 |
| Orientation angle | 63 | −10 | −13 |

As shown in Table 3, the orientation magnitude in this case was within the range from 1.0 to 1.1. Since the CNTs are not oriented, the orientation angle was not uniform.

Figure 4:
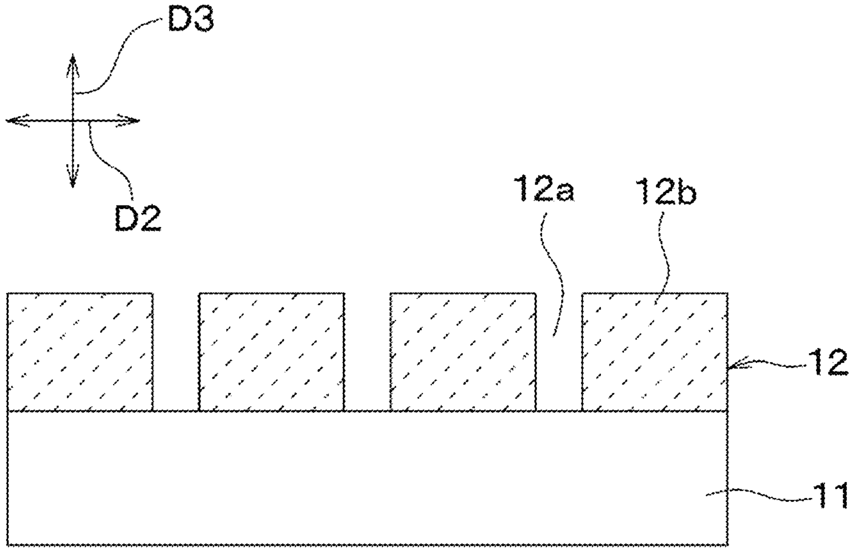
FIG. 4 is a cross-sectional view showing a process of preparing a filter in a method for manufacturing a transparent filter according to the first embodiment.

Next, a method for manufacturing the transparent heater 1 of the present embodiment will be described. First, as shown in FIG. 4, a process of preparing a filter 11 covered with the resist 12 is performed.

The filter 11 is used to separate the CNTs from the dispersion medium and capture the CNTs. The filter 11 is a porous body having a plurality of pores. The size of the plurality of pores is a size that allows the dispersion medium to pass through but does not allow the CNTs to pass through. As the filter 11, for example, a membrane filter is used.

The resist 12 is a covering material that covers one surface of the filter 11. The resist 12 is a dense body having no hole. The resist 12 has cavity portions 12*a* for forming the plurality of patterned portions 4 and covering portions 12*b* covering the filter 11. The cavity portions 12*a* are located in areas where the plurality of patterned portions 4 are to be formed in a region on the one surface of the filter 11. The layout of the cavity portions 12*a* is the same as the layout of the plurality of patterned portions 4. The width of the cavity portion 12*a* corresponding to the width of the patterned portion 4 is smaller than the average length of the CNTs or the average length of the bundles of CNTs (that is, bundles). The covering portions 12*b* are located in areas where the non-patterned portions 5 are to be formed in the region on one surface of the filter 11.

Figure 5A:
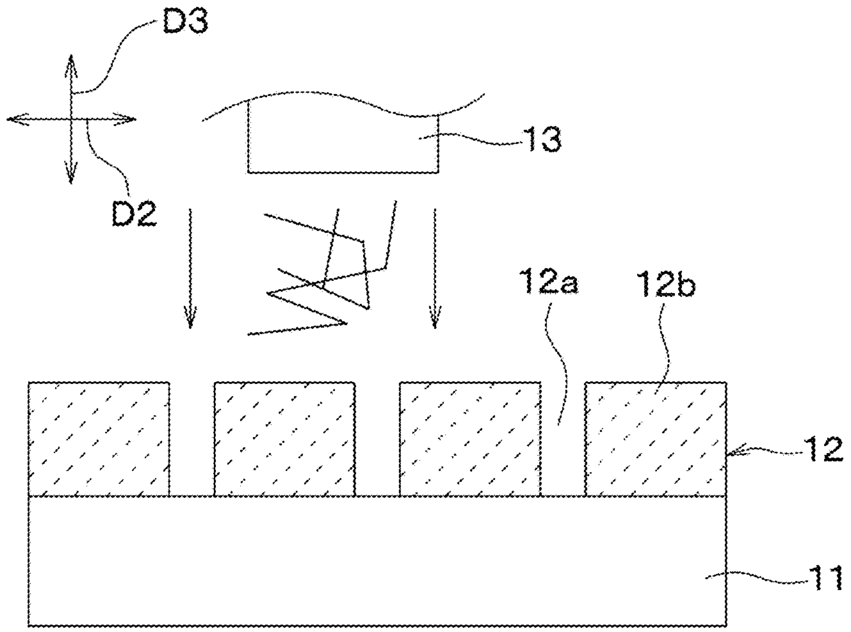
FIG. 5A is a diagram showing a process of capturing CNTs in the method for manufacturing a transparent filter according to the first embodiment.

Subsequently, a process of capturing CNTs on the one surface of the filter 11 is performed. In this process, as shown in FIG. 5A, a CNT dispersion is supplied from a tube 13, which is positioned opposite to the filter 11 with respect to the resist 12 in the third direction D3, toward the filter 11. The CNT dispersion includes CNTs and a dispersion medium. The dispersion medium is a gas for dispersing the CNTs. The dispersion medium may be a liquid.

Figure 5B:
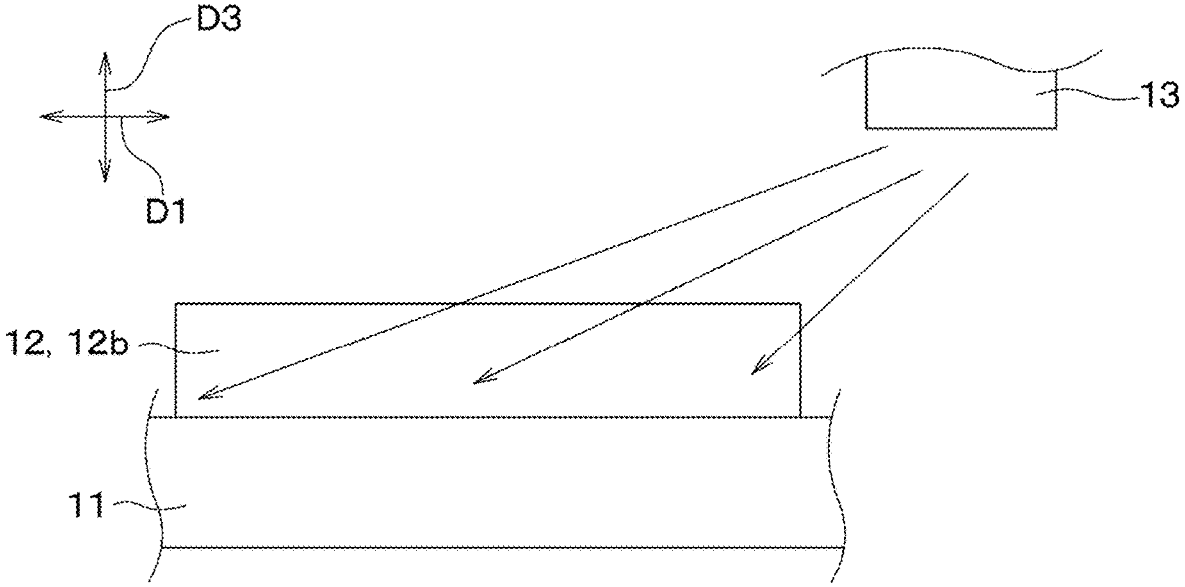
FIG. 5B is a diagram showing a flow of CNT dispersion in a cavity portion of a resist in the process shown in FIG. 5A.

In this case, the tube 13 and the filter 11 are disposed at positions so that the flow of the CNT dispersion medium from the tube 13 toward the filter 11 becomes the flow along the first direction D1. Specifically, as shown in FIG. 5B, the tube 13 and the filter 11 are disposed at different positions in the first direction D1. Therefore, as indicated by arrows in FIG. 5B, the CNT dispersion flows from the tube 13 toward the filter 11 in oblique directions including the third direction D3 and the first direction D1.

Figure 5C:
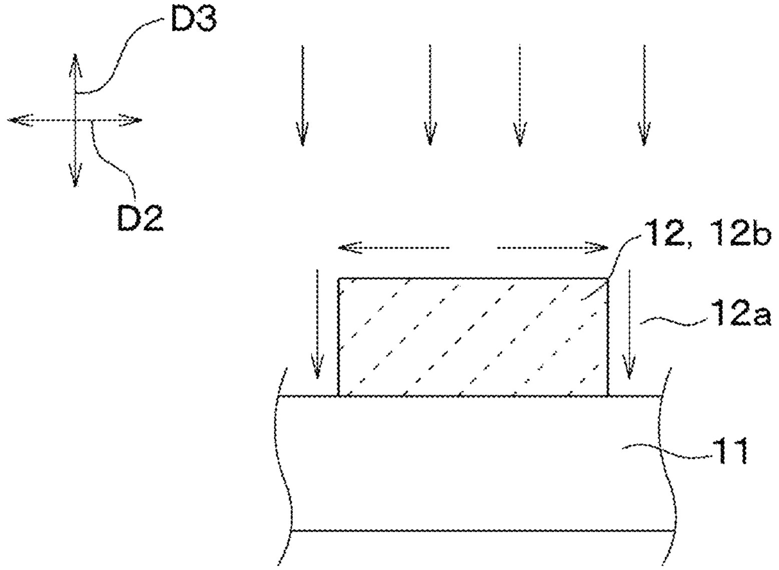
FIG. 5C is a diagram showing the flow of the CNT dispersion on an upper surface of a coating portion of the resist and the cavity portion in the process shown in FIG. 5A.

As shown in FIG. 5C, when the velocity of the flows of the CNT dispersion passing through the cavity portions 12*a* is high, flows of the CNT dispersion directing from the central side of the cover portion 12*b* toward the cavity portions 12*a* are formed on the surface of the cover portion 12*b*. The flows of the CNT dispersion directly from the central side of the coating portion 12*b* toward the cavity portions 12*a* are flows along the second direction D2 of the CNT dispersion. Therefore, the velocity of the flow of the CNT dispersion passing through the cavity portion 12*a* is set to the velocity at which the flow of the CNT dispersion along the second direction D2 is formed on the surface of the coating portion 12*b*. Specifically, at least one of setting the velocity of the flow of the CNT dispersion from the tube 13 to be large and setting the width of the cavity portion 12*a* in the second direction D2 to be narrow is performed.

Figure 5D:
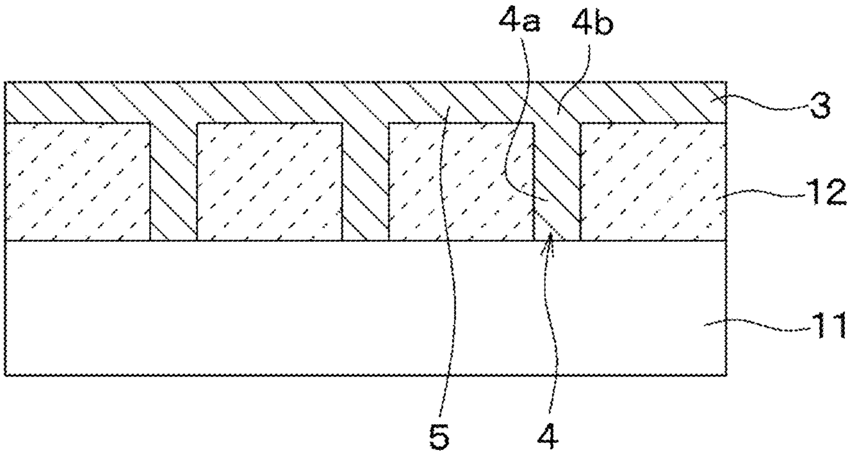
FIG. 5D is a diagram showing a conductive portion formed by capturing the CNTs in the process shown in FIG. 5A.

The CNTs are captured in the cavity portions 12*a* and on the surface of the resist 12. As a result, as shown in FIG. 5D, the conductive layer 3 having the patterned portions 4 and the non-patterned portions 5 are formed on the one surface of the filter 11. In this case, the CNT dispersion flows in the cavity portions 12*a* along the first direction D1. Therefore, the CNTs constituting the linear portion 4*a* of the patterned portion 4 are oriented in the direction along the first direction D1. The CNT dispersion flows on the surface of the coating portion 12*b* along the second direction D2. Therefore, the CNTs constituting the non-patterned portion 5 are oriented in the direction along the second direction D2.

Figure 6A:
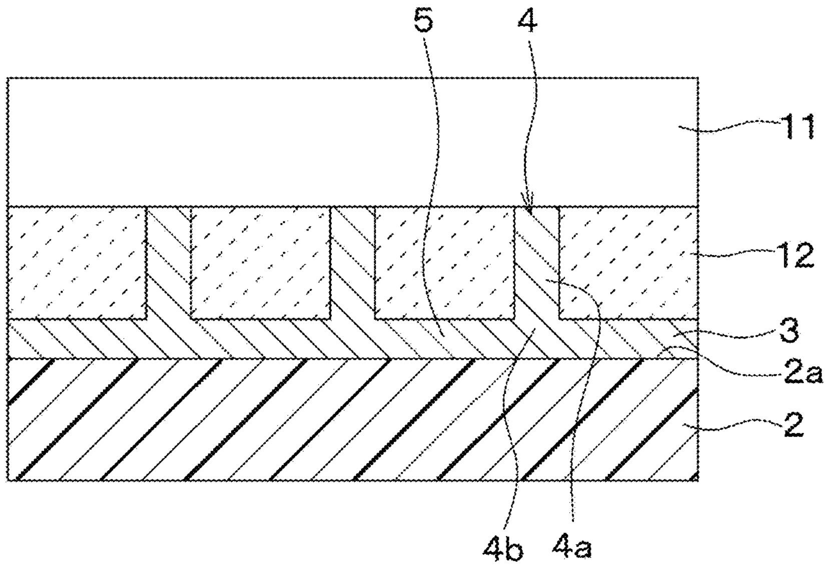
FIG. 6A is a diagram showing a part of a process of transferring the conductive portion to a transparent substrate in the method for manufacturing a transparent filter according to the first embodiment.
Figure 6B:
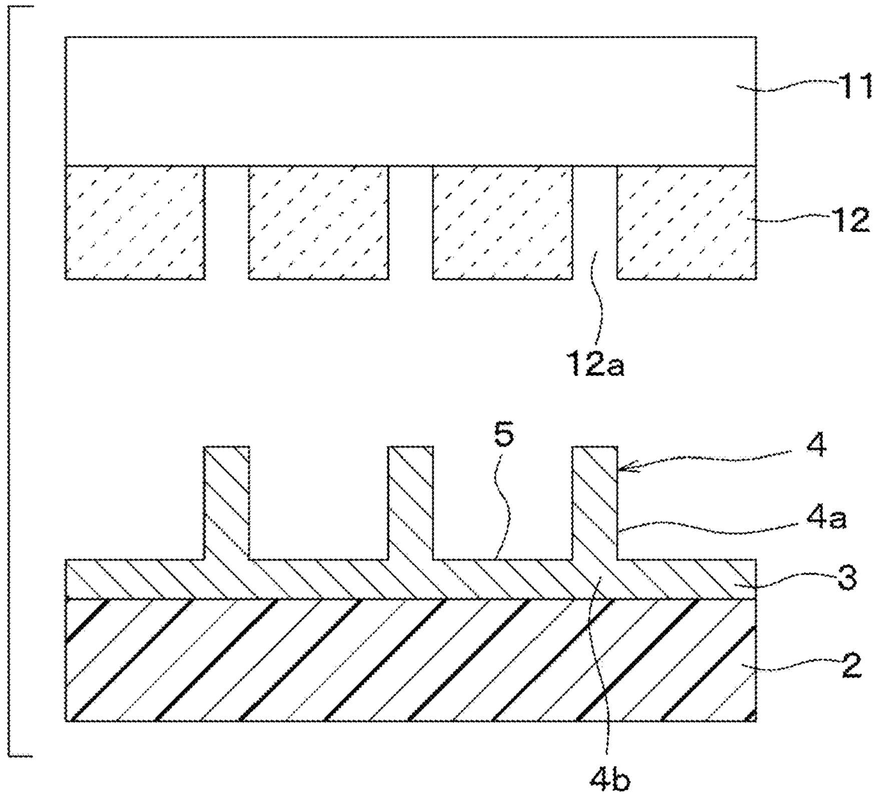
FIG. 6B is a diagram showing a process subsequent to the process shown in FIG. 6A.

Subsequently, a process of transferring the conductive layer 3 to the substrate 2 is performed. As shown in FIG. 6A, the one surface 2*a* of the substrate 2 is brought into contact with the conductive layer 3. As shown in FIG. 6B, the filter 11 and the resist 12 are separated from the substrate 2. As a result, the conductive layer 3 is formed on the one surface 2*a* of the substrate 2. In this way, the transparent heater 1 is manufactured.

Next, the relationship between the orientation direction of the CNTs and the ease of thermal conduction in the film composed of the CNTs will be described. The present inventors investigated the difference in thermal conduction between four films having different orientation direction of the CNTs.

Figure 7:
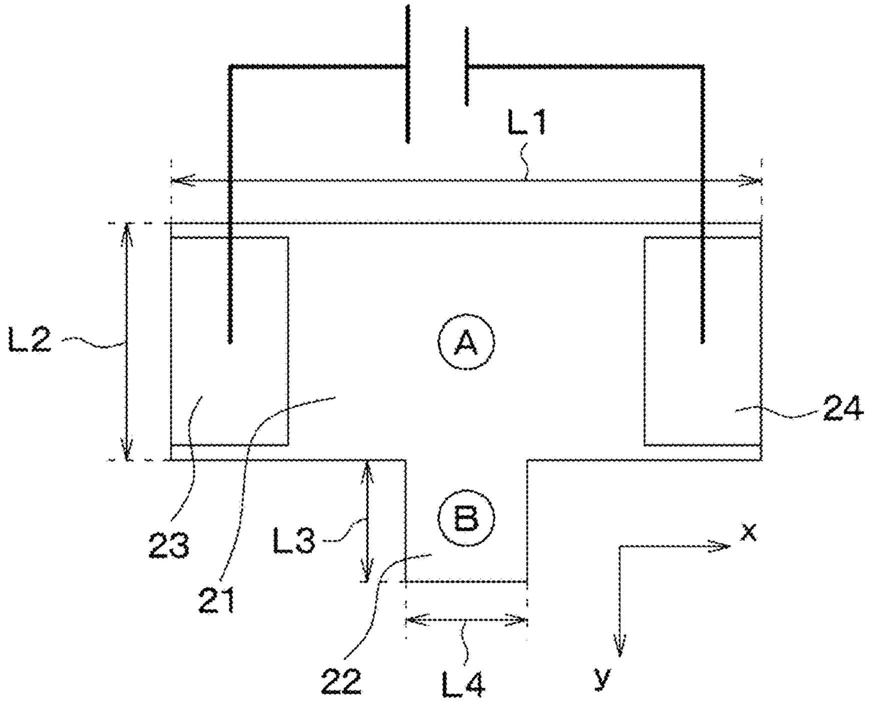
FIG. 7 is a plan view of a test specimen used in a test for examining the relationship between an orientation direction of CNTs and the ease of thermal conduction.

Each of the four films is formed on a PC substrate. The thickness of the four films is uniform. As shown in FIG. 7, each of the four films has a shape including a rectangular first region 21 and a square second region 22. The first region 21 has a longitudinal direction along an x direction, and a transverse direction in a y direction orthogonal to the z direction. The second region 22 is continuous with the middle portion of a lengthwise side of the first region 21. The second region 22 protrudes from the first region 21 in the y direction.

A length L1 of the first region 21 in the x direction is 50 mm. A length L2 of the first region 21 in the y direction is 20 mm. A length L3 and a length L4 of the respective sides of the second region 22 is 10 mm.

The four films have the orientation directions of 0°, 45°, 90° and random with respect to the x direction, respectively. The direction defining 0° with respect to the x direction is the x direction. The direction defining 90° with respect to the x direction is the y direction. The orientation direction of the CNTs is the same in the whole of one film. Each of the four films is cut out from the same film in which CNTs are oriented in one direction. The orientation magnitudes of the films measured by the orientation evaluation method described above were 1.12, 1.13, and 1.20.

Electrodes 23 and 24 are formed at opposite ends of the first region 21 in the x direction. When a current is caused between the electrodes 23 and 24, the current flows through the first region 21, and the first region 21 generates heat. However, no current flows in the second region 22, and the second region 22 does not generate heat. When the first region 21 generates heat, the heat is transferred from the first region 21 to the second region 22 by thermal conduction. Therefore, the current was caused to flow between the electrodes 23 and 24, and the temperature at a point B in the second region 22 was measured when the temperature at a point A in the first region 21 reached about 35° C. In this way, the ease of heat transfer in the y direction of each film was examined. The room temperature at that time was around 25° C. The measurement results are shown in Table 4 and FIG. 8.

TABLE 4

| Orientation Direction | Point A Temperature [° C.] | Point B Temperature [° C.] |
|---|---|---|
| 0° | 35.1 | 25.7 |
| 45° | 35.1 | 26.9 |
| 90° | 35.0 | 28.1 |
| No orientation | 35.0 | 26.7 |

Figure 8:
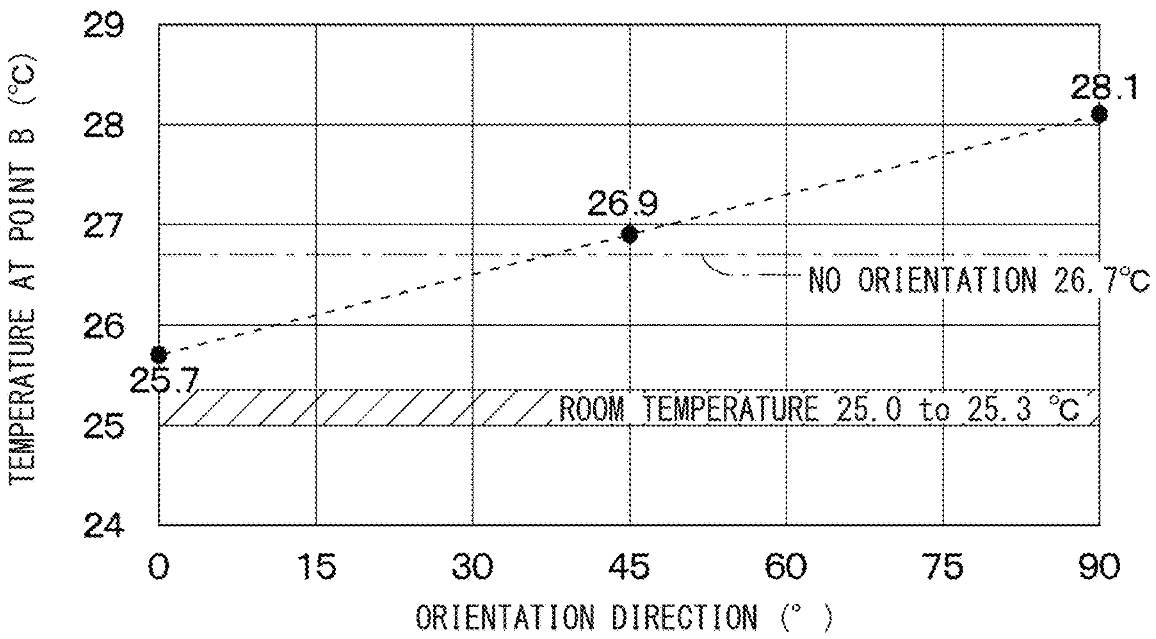
FIG. 8 is a diagram showing the results of the test for examining the relationship between the orientation direction of CNTs and the ease of thermal conduction.

As shown in Table 4, the temperature of the point B was the lowest when the film has the orientation direction of 0°, and the temperature of the point B was the highest when the film has the orientation direction of 90°. The temperature of the point B of the film having the orientation direction of 45° was almost the same as the temperature of the point B of the film having no orientation. As shown in FIG. 8, when the orientation direction is greater than 45 degrees and equal to or lower than 90 degrees, the temperature of the point B was higher than that of the film having no orientation.

Accordingly, it was found that the heat transfer in the y direction is more likely to occur when the orientation direction is greater than 45° and equal to or less than 90°, as compared with the case where the CNTs have no orientation. The orientation direction being greater than 45° and equal to or less than 90° is the same as the orientation direction defining an angle less than 45° with respect to the y direction.

Next, effects of the transparent heater 1 of the present embodiment will be described. The transparent heater 1 of the present embodiment is compared with a transparent heater 1 of a comparative example. The transparent heater 1 of the comparative example is different from the transparent heater 1 of the present embodiment in that CNTs are not oriented in each of the patterned portions 4 and the non-patterned portions 5. Other configurations of the transparent heater 1 of the comparative example are the same as those of the transparent heater 1 of the present embodiment.

In the transparent heater 1 of the comparative example, the conductive layer 3 generates heat by electrical conduction. However, due to the difference in thickness between the patterned portion 4 and the non-patterned portion 5, the amount of heat generation between the patterned portion 4 and the non-patterned portion 5 is different. That is, since the patterned portion 4 is thicker than the non-patterned portion 5, the patterned portion 4 generates more heat than the non-patterned portion 5. Therefore, the temperature of the non-patterned portion 5 is lower than that of the patterned portion 4, and temperature unevenness occurs in a planar direction parallel to the one surface 2*a* of the substrate 2. The temperature unevenness becomes more remarkable as the interval between the adjacent patterned portions 4, that is, the width of the non-patterned portion 5 is increased in order to ensure the transparency of the conductive layer 3.

In the transparent heater 1 of the present embodiment, the CNTs constituting the non-patterned portion 5 are oriented in the direction defining the angle of less than 45 degrees with respect to the second direction D2. As described above, the heat transfer in the y direction is more likely to occur when the orientation direction of the CNTs defines the angle of less than 45 degrees with respect to the y direction than when the CNTs are not oriented. Therefore, as compared with the transparent heater of the comparative example, the non-patterned portion 5 easily conducts heat in the second direction D2. That is, heat is easily conducted from the patterned portion 4 to the entire non-patterned portion 5. As a result, the temperature difference between the patterned portions 4 and the non-patterned portions 5 can be reduced, and the temperature unevenness in the planar direction of the transparent heater 1 can be reduced.

According to the transparent heater 1 of the present embodiment, the following effects are obtained.

(1) The CNTs constituting the linear portion 4*a* of the patterned portion 4 are oriented in the direction defining an angle of less than 45 degrees with respect to the first direction D1. The current easily flows in the orientation direction of the CNTs. Therefore, the electric resistance of the patterned portion 4 can be reduced, as compared with the transparent heater 1 of the comparative example.

(2) The non-patterned portion 5 is directly connected to the patterned portion 4 without an adhesive layer interposed therebetween. This facilitates thermal conduction from the patterned portion 4 to the non-patterned portion 5, as compared with a case where the patterned portion 4 and the non-patterned portion 5 are connected via an adhesive layer.

(3) The width of the patterned portion 4 in the second direction D2 is narrower than the average length of the CNTs or the average length of the bundles of CNTs. Accordingly, when the CNT dispersion is filtered by the filter 11 covered with the resist 12 to form the linear portion 4*a* of the patterned portion 4, the CNTs can be oriented in the first direction D1 or a direction close the first direction D1.

Other Embodiments (1) In the embodiment described above, the CNTs constituting the linear portion 4*a* of the patterned portion 4 are oriented. However, the CNTs constituting the linear portion 4*a* may have no orientation. Even in this case, the temperature unevenness in the planar direction of the transparent heater 1 can be reduced.

(2) In the embodiment described above, the patterned portions 4 and the non-patterned portions 5 are formed at the same time. Accordingly, the patterned portions 4 and the non-patterned portions 5 are directly in continuous with each other. However, the patterned portions 4 and the non-patterned portions 5 may be formed separately and then bonded to each other via an adhesive layer.

(3) In the embodiment described above, in the process of capturing the CNTs, the tube 13 and the filter 11 are disposed at different positions in the first direction D1. Accordingly, the CNT dispersion flows through the cavity portions 12*a* of the resist 12 along the first direction D1. However, apart from the tube 13, a supply port for supplying a gas such as nitrogen gas is disposed beside the resist 12. The gas flows from the supply port in a direction along the first direction D1. In this way, the CNT dispersion supplied from the tube 13 may be caused to flow through the cavity portion 12*a* of the resist 12 along the first direction D1.

(4) The present disclosure is not limited to the foregoing description of the embodiment and can be modified as appropriate, and thus encompass various modifications and modification in equivalent ranges. The embodiments described above are not independent of each other, and can be appropriately combined except when the combination is obviously impossible. In each of the embodiments described above, individual elements or features of a particular embodiment are not necessarily essential unless it is specifically stated that the elements or the features are essential, or unless the elements or the features are obviously essential in principle. Further, in each of the embodiments described above, when numerical values such as the number, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Furthermore, in each of the embodiments described above, when referring to the material, shape, positional relationship, and the like of the components and the like, except in the case where the components are specifically specified, and except in the case where the components are fundamentally limited to a specific material, shape, positional relationship, and the like, the components are not limited to the material, shape, positional relationship, and the like.

The invention claimed is:

1. A transparent heater comprising:

a substrate being transparent to a visible light and having one surface; and a conductive layer disposed on the one surface, being transparent to the visible light, and containing an aggregate of carbon nanotubes, wherein the conductive layer includes:

a patterned portion that includes a linear portion linearly extending in a first direction parallel to the one surface; and a non-patterned portion that is a film-shaped portion connecting to the patterned portion in a second direction, which is parallel to the one surface and orthogonal to the first direction, and has a thickness smaller than that of the patterned portion in a third direction, which is orthogonal to the one surface, and wherein the non-patterned portion has an orientation direction of the carbon nanotubes defining less than 45 degrees with respect to the second direction, the orientation direction being measure by an orientation evaluation method using an image processing on an electron microscope image.

2. The transparent heater according to claim 1, wherein the linear portion of the patterned portion has an orientation direction of the carbon nanotubes defining an angle of less than 45 degrees with respect to the first direction, the orientation direction being measured by the orientation evaluation method.

3. The transparent heater according to claim 1, wherein the non-patterned portion directly connects to the patterned portion.

4. The transparent heater according to claim 1, wherein the patterned portion has a width in the second direction that is smaller than an average length of the carbon nanotubes or an average length of bundles of the carbon nanotubes.

* * * * *